(12) United States Patent
Endo

(10) Patent No.: US 9,076,189 B2
(45) Date of Patent: Jul. 7, 2015

(54) CODING APPARATUS AND METHOD FOR ENCODING IMAGE DATA

(71) Applicant: CANON KABUSHIKI KAISHA, Tokyo (JP)

(72) Inventor: Hiroaki Endo, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 13/911,527

(22) Filed: Jun. 6, 2013

(65) Prior Publication Data

US 2013/0343667 A1    Dec. 26, 2013

(30) Foreign Application Priority Data

Jun. 21, 2012   (JP) .................................. 2012-140101

(51) Int. Cl.
  *G06K 9/36*    (2006.01)
  *G06T 9/00*    (2006.01)

(52) U.S. Cl.
  CPC .......................................... *G06T 9/00* (2013.01)

(58) Field of Classification Search
  CPC ...... G06K 9/00; G06T 9/004; H04N 7/26079; H04N 19/0009; H04N 19/00781; H04N 19/00969; H04N 19/00987; H04N 19/119; H04N 19/124; H04N 19/13; H04N 19/132; H04N 19/172; H04N 19/176; H04N 19/192; H04N 19/463; H04N 19/51; H04N 19/60; H04N 19/90; H04N 19/91; H04N 19/96
  See application file for complete search history.

(56) References Cited

U.S. PATENT DOCUMENTS 7,596,279 B2 *   9/2009   Sugimoto et al. ............. 382/238
8,649,620 B2 *   2/2014   Shibahara et al. ............ 382/233
8,804,823 B2 *   8/2014   Shibahara et al. ....... 375/240.03

FOREIGN PATENT DOCUMENTS

JP        2010-50833 A        3/2010

* cited by examiner

*Primary Examiner* — Jose Couso
(74) *Attorney, Agent, or Firm* — Fitzpatrick, Cella, Harper & Scinto

(57) ABSTRACT

When performing pipeline processes by a prediction method determination unit, prediction coding unit, and entropy coding unit, the size of a block of an integer conversion unit (transform unit: TU) is set smaller than the size of a CU (Coding Unit). A generated code amount is fed back to the prediction coding unit on the TU basis, reducing a feedback delay and increasing the quantization control accuracy.

12 Claims, 5 Drawing Sheets

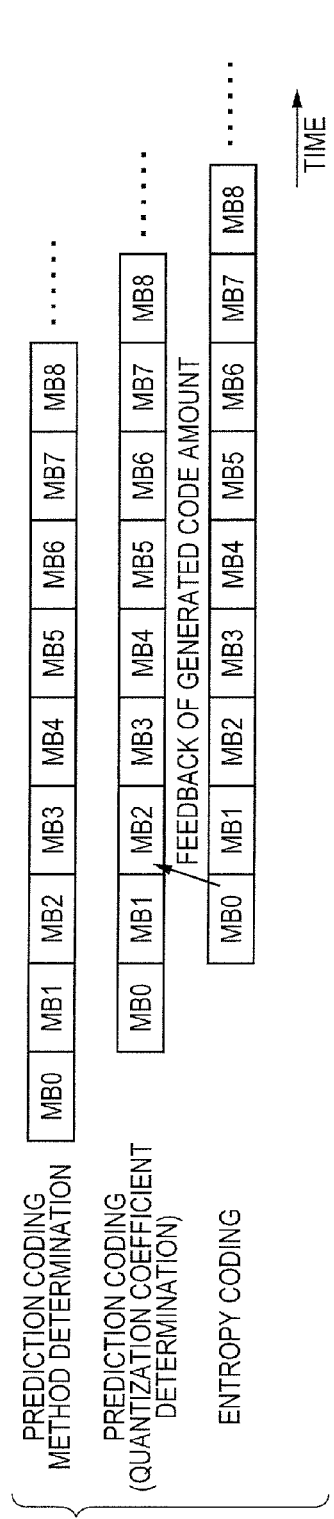
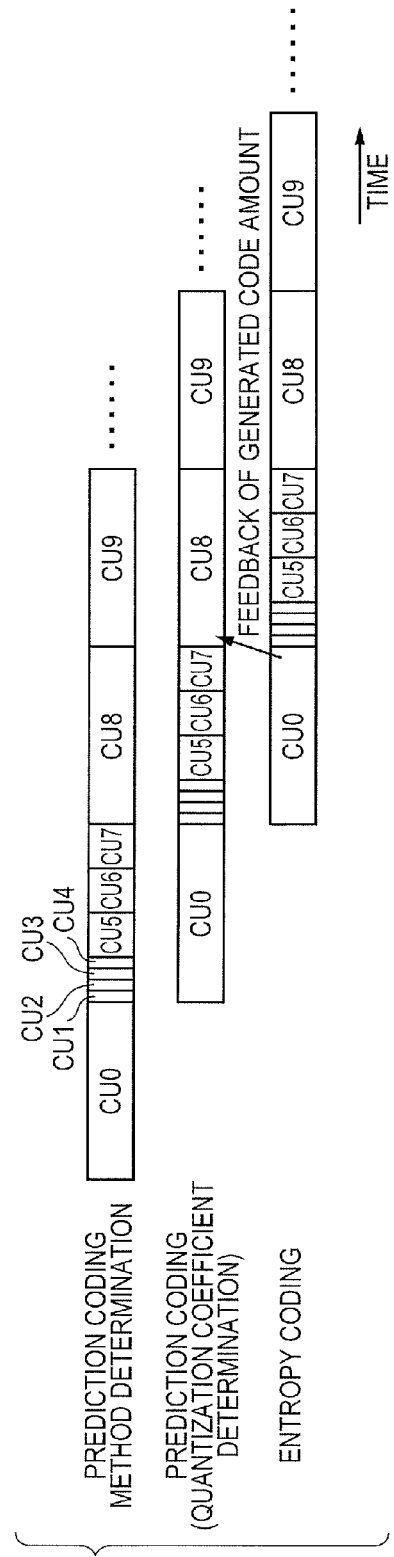

CODING APPARATUS AND METHOD FOR ENCODING IMAGE DATA

BACKGROUND OF THE INVENTION

1. Field of the Invention

The present invention relates to an image coding apparatus and image coding method and, more particularly, to a technique suitable for use in a coding apparatus arranged to change a size of a block as a coding unit.

2. Description of the Related Art

Recently, as digitization of information associated with so-called multimedia including audio signal and image signal has made rapid progress, compression coding/decoding techniques for the image signal are receiving attention. The compression coding/decoding techniques can reduce the storage capacity necessary to store image signals and the band necessary for transmission, and thus are very important techniques in the multimedia industry.

These compression coding/decoding techniques compress the information amount/data amount by using the degree of autocorrelation (that is, redundancy) which many image signals have therein. The redundancy of an image signal includes temporal redundancy and two-dimensional spatial redundancy. The temporal redundancy can be reduced using motion detection and motion compensation for each block. In contrast, the spatial redundancy can be reduced using discrete cosine transform (DCT). One coding method using these techniques is H.264/MPEG-4 PART10 (AVC) (to be referred to as H.264 hereinafter).

When implementing the H.264 coding process by hardware, the coding process is generally divided into a prediction coding method determination process, prediction coding process, and entropy coding process, and the respective processes are pipelined on the coding block unit basis (Japanese Patent Application Laid-Open No. 2010-50833). It is also common practice to arrange a mechanism which feeds back a code amount after entropy coding on the coding block basis and controls a quantization coefficient on the coding block basis so that the code amount after entropy coding falls within a predetermined code amount.

The control of the quantization coefficient is included in the prediction coding process among the above-mentioned pipeline processes. The pipeline processes generate a delay of two macroblocks until feedback of a code amount is reflected in the quantization coefficient. FIG. 5A is a view schematically showing the above-mentioned pipeline processes. In FIG. 5A, MB represents a coding block, and feedback of the generated code amount of MB0 is reflected in MB2.

In recent years, next-generation coding methods are being studied. One of the techniques under consideration is a changeable coding block size. This technique increases the coding efficiency by changing the size of a coding block serving as a coding unit in accordance with features of an image.

FIG. 4 shows an example in which a part of an image frame is divided into coding blocks of a plurality of sizes. In FIG. 4, (CU) represents a coding block. Here, a part of an image frame is divided into 10 coding blocks CU0 to CU9.

However, when the size of a coding block is changeable, if the quantization coefficient is determined by feeding back the generated code amount of a coding block similarly to the conventional coding method, the delay until feedback of a code amount is reflected in the quantization coefficient may increase. For example, when CU sizes are those as shown in FIG. 4, feedback of the generated code amount of CU0 is reflected in CU8, as shown in FIG. 5B.

SUMMARY OF THE INVENTION

The present invention has been made to solve the above problems, and enables reducing a delay of feedback of a generated code amount and controlling a quantization coefficient at high accuracy even when the size of a coding block is changeable in an image frame.

According to an aspect of the present invention, an image coding apparatus for coding a frame image on a unit basis of a coding block including a plurality of pixels, comprises a determination unit configured to determine a size of a coding block from a plurality of different sizes, a transform unit configured to orthogonally transform image data regarding the coding block at a given size, a quantization unit configured to quantize the image data orthogonally transformed by the transform unit by using a quantization coefficient, an entropy coding unit configured to entropy-code the image data quantized by the quantization unit, and a quantization control unit configured to acquire information of a generated code amount on a orthogonal transform unit basis from the entropy coding unit, and control a quantization coefficient of a subsequent coding block in accordance with the acquired information of the generated code amount, wherein the size of the orthogonal transform is smaller than the size of the coding block.

Further features of the present invention will become apparent from the following description of exemplary embodiments with reference to the attached drawings.

BRIEF DESCRIPTION OF THE DRAWINGS

FIGS. 5A and 5B are views schematically showing conventional pipeline processes based on the coding block unit.

DESCRIPTION OF THE EMBODIMENTS

Preferred embodiments of the present invention will now be described in detail in accordance with the accompanying drawings.

First Embodiment

Figure 1:
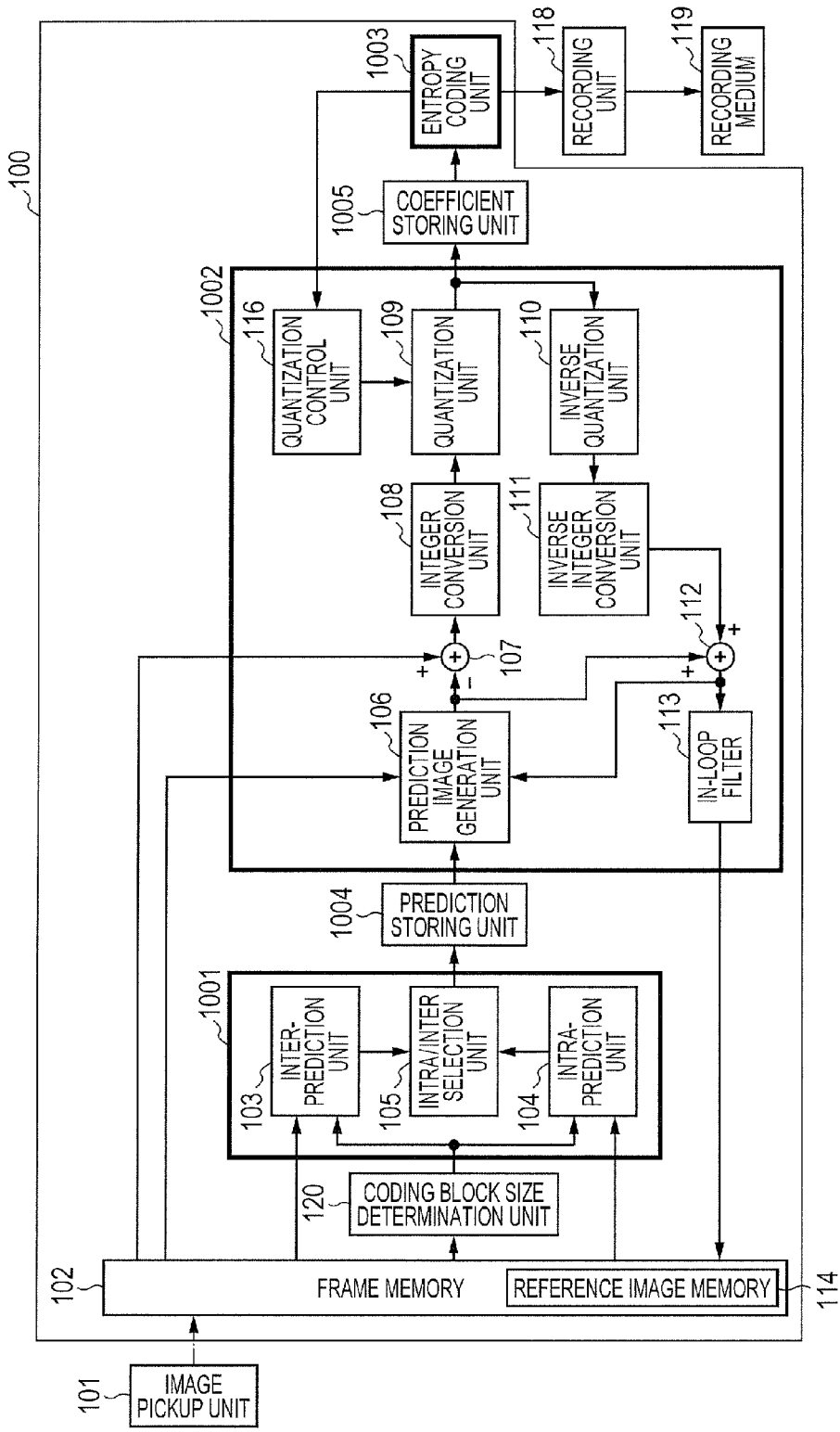
FIG. 1 is a block diagram exemplifying the arrangement of an image pickup apparatus including an image coding apparatus according to the first embodiment.

FIG. 1 is a block diagram exemplifying the arrangement of an image pickup apparatus including an image coding apparatus 100 according to the first embodiment of the present invention. In the image pickup apparatus of FIG. 1, building components not particularly relevant to the image coding apparatus of the present invention are omitted or simplified.

In FIG. 1, the image pickup apparatus includes the image coding apparatus 100 according to the present invention, an image pickup unit 101 which includes a camera unit including a lens and image pickup sensor to acquire image data, and a recording unit 118. The image pickup apparatus is configured to detachably mount a recording medium 119.

The image coding apparatus 100 includes a frame memory 102, a coding block size determination unit 120 which determines the size (number of pixels) of a coding block serving as a coding unit (CU), a prediction method determination unit 1001, a prediction storing unit 1004 which temporarily stores information necessary for prediction coding such as a prediction method, a prediction coding unit 1002, a coefficient storing unit 1005 which temporarily stores information necessary for entropy coding such as a quantized coefficient value, and an entropy coding unit 1003. The frame memory 102 of the image coding apparatus 100 includes a reference image memory 114 which stores a reference image to be used for inter-prediction. The image coding apparatus 100 divides a frame image into coding blocks of different sizes, and codes it on the coding block basis.

The prediction method determination unit 1001 includes an inter-prediction unit 103 which searches for a motion vector, and an intra-prediction unit 104 which selects an intra-prediction method. Further, the prediction method determination unit 1001 includes an intra/inter selection unit 105 which selects an inter-prediction or intra-prediction method.

The prediction coding unit 1002 includes a prediction image generation unit 106, subtracter 107, integer conversion unit 108, and quantization unit 109. Further, the prediction coding unit 1002 includes an inverse quantization unit 110, inverse integer conversion unit 111, adder 112, in-loop filter 113, and quantization control unit 116.

Moving image data obtained by picking up an object by the image pickup unit 101 are sequentially stored in the frame memory 102, and the image data are extracted in the coding order.

Each of the prediction method determination unit 1001, prediction coding unit 1002, and entropy coding unit 1003 pipelines on the unit basis of the coding block CU, that is, each process operates in parallel in a part or all of the period. Detailed contents of each process will be explained below.

(CU Prediction Method Determination Process)

Figure 4:
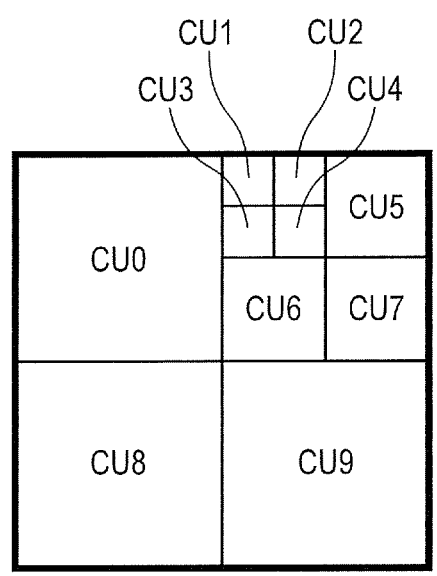
FIG. 4 is a view showing an example in which a part of an image frame is divided into coding blocks of a plurality of sizes.

As described with reference to FIG. 4, the coding block size determination unit 120 according to the present embodiment increases the coding efficiency by changing the size of a coding block serving as a coding unit in accordance with features of an image. As described above, FIG. 4 shows an example in which a part of a frame image is divided into coding blocks of a plurality of sizes. In FIG. 4, a coding unit (CU) represents a coding block. Here, a part of a frame image is divided into 10 coding blocks CU0 to CU9. The maximum size of the coding block (maximum coding block) is a region (largest coding unit) surrounded by a thick line (periphery) in FIG. 4.

Image data of a coding subject CU is read out from the frame memory 102 in accordance with a coding block size determined by the coding block size determination unit 120, and is input to the inter-prediction unit 103 and intra-prediction unit 104. The coding block size determination method is arbitrary. For example, the coding block size may be determined from edge information of an image.

The inter-prediction unit 103 reads out reference image data from the reference image memory 114. The inter-prediction unit 103 detects a motion vector based on the correlation between image data of a coding subject CU and reference image data in a motion search area, and notifies the intra/inter selection unit 105 of it.

The intra-prediction unit 104 reads out, from the frame memory 102, data of pixels surrounding a coding subject CU. Then, the intra-prediction unit 104 selects an intra-prediction method based on the correlation between image data of the coding subject CU and a plurality of intra-prediction image data generated from the data of the pixels surrounding the coding subject CU. The intra-prediction unit 104 notifies the intra/inter selection unit 105 of the selected intra-prediction method. Note that data of surrounding pixels may be reconstruction image data output from the adder 112.

The intra/inter selection unit 105 receives the result of the inter-prediction unit 103 and that of the intra-prediction unit 104, and selects, for example, a prediction method having a smaller difference value. The intra/inter selection unit 105 temporarily stores the selected prediction method in the prediction storing unit 1004 together with information necessary for a CU prediction coding process to be described later.

(CU Prediction Coding Process)

The prediction image generation unit 106 reads out the prediction method of a coding subject CU from the prediction storing unit 1004, and generates a prediction image in accordance with the prediction method. In a case where the prediction method is inter-prediction, the prediction image generation unit 106 reads out corresponding data from the reference image memory 114 in accordance with prediction information such as a motion vector read out from the prediction storing unit 1004, and generates a prediction image. In a case where the prediction method is intra-prediction, the prediction image generation unit 106 generates prediction image data from reconstruction image data output from the adder 112 in accordance with the intra-prediction method read out from the prediction storing unit 1004.

The subtracter 107 receives image data of the original image of a coding subject CU read out from the frame memory 102, and the above-described prediction image data. The subtracter 107 calculates a pixel value difference between the original image of the coding subject CU and the prediction image, and outputs the difference data to the integer conversion unit 108. The integer conversion unit 108 subjects difference data of the pixel values to orthogonal transform.

Integer conversion will be exemplified as the orthogonal transform in the present embodiment, but the orthogonal transform may be discrete cosine transform (DCT) or the like. Integer conversion is performed on an integer conversion unit block (TU: Transform Unit) serving as a unit of integer conversion. In the present embodiment, the TU is smaller than a coding subject CU, and is divided into, e.g., two in each of the horizontal and vertical directions. However, the division number is not limited to this. The quantization unit 109 quantizes, using the quantization coefficient notified from the quantization control unit 116, a conversion coefficient generated by integer conversion, and temporarily stores the quantized conversion coefficient in the coefficient storing unit 1005.

The quantization control unit 116 controls the quantization coefficient to obtain a code amount (bit rate of a stream) designated in advance from a controller (not shown) based on a notification of a code amount generated by the entropy coding unit 1003 to be described later.

The conversion coefficient quantized by the quantization unit 109 is also input to the inverse quantization unit 110. The inverse quantization unit 110 inversely quantizes the input conversion coefficient, and the inverse integer conversion unit 111 subjects the inversely quantized signal to an inverse integer conversion process.

The adder 112 receives and adds the inversely integer-converted data and prediction image data generated by the prediction image generation unit 106. The added data serves as decoded reconstruction image data, and is input to the prediction image generation unit 106 to be used to generate intra-prediction image data. The reconstruction image data undergoes a coding distortion reduction process by the in-loop filter 113, and stored in the reference image memory 114 as reference image data used in inter-coding.

(CU Entropy Coding Process)

The entropy coding unit 1003 reads out information such as the quantized conversion coefficient of a coding subject CU and the prediction method from the coefficient storing unit 1005, entropy-codes it, and outputs the entropy-coded information as a stream to the recording unit 118. After entropy coding for coding information such as the prediction method, the entropy coding unit 1003 entropy-codes a plurality of TUs included in the CU, and notifies the quantization control unit 116 of the generated code amount.

Figure 2:
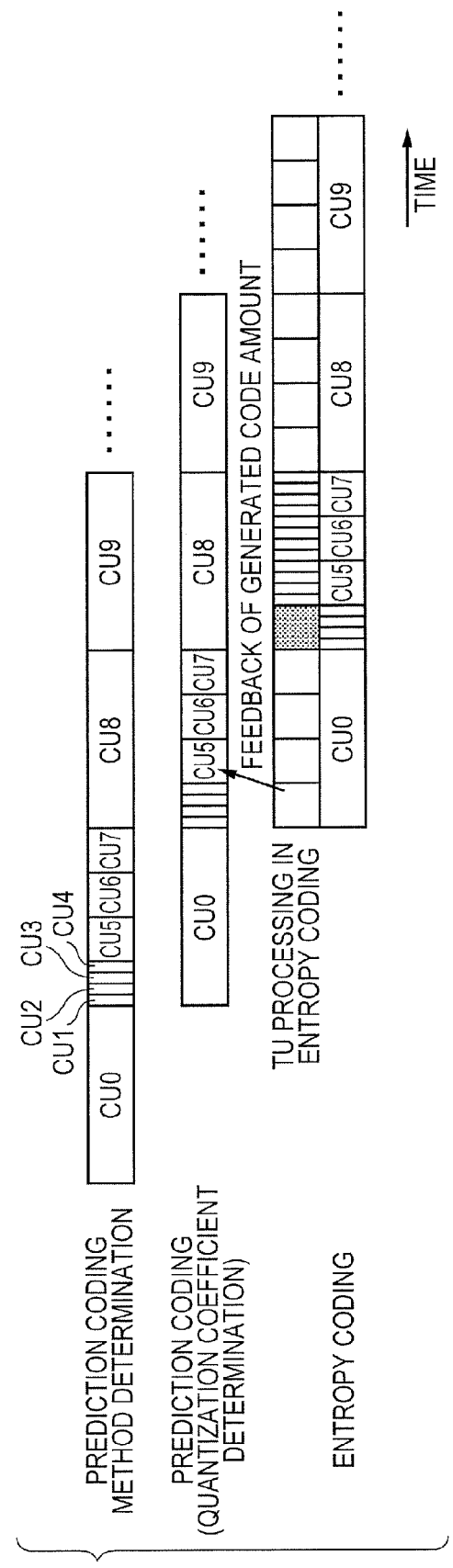
FIG. 2 is a view schematically showing pipeline processes based on the coding block unit according to the first embodiment.

Entropy coding by the entropy coding unit 1003 is sequentially performed on the TU (a unit of orthogonal transform) basis. Every time entropy coding of one TU ends, the entropy coding unit 1003 notifies the quantization control unit 116 of a code amount generated in the TU. FIG. 2 schematically shows a processing sequence when a plurality of CUs are divided as shown in FIG. 4. In the embodiment, the TU size is smaller than the CU size, and a generated code amount is fed back to the prediction coding unit 1002 on the TU basis. Thus, the notification of the code amount of the first TU of CU0 is received at the time of CU5 in the prediction coding process.

The operation according to the embodiment can shorten a delay of feedback of a generated code amount to the quantization control unit 116, and control the quantization coefficient at high accuracy.

Note that a code amount generated by the entropy coding unit 1003 is not the code amount of a stream to be output to the recording unit 118, and may be an amount corresponding to a code amount, such as the amount of intermediate data generated in progress of entropy coding.

The recording unit 118 records, in the recording medium 119, the stream output from the entropy coding unit 1003. The recording process need not be performed on the CU basis, and a stream multiplexed with audio data may be generated and then recorded.

In the present embodiment, the coding processes are pipelined by three processes, that is, the prediction method determination process, prediction coding process, and entropy coding process. However, the process division number, and the contents of a detailed process included in each pipeline process are not limited to this.

Second Embodiment

The second embodiment of the present invention will be described with reference to FIG. 3.

Figure 3:
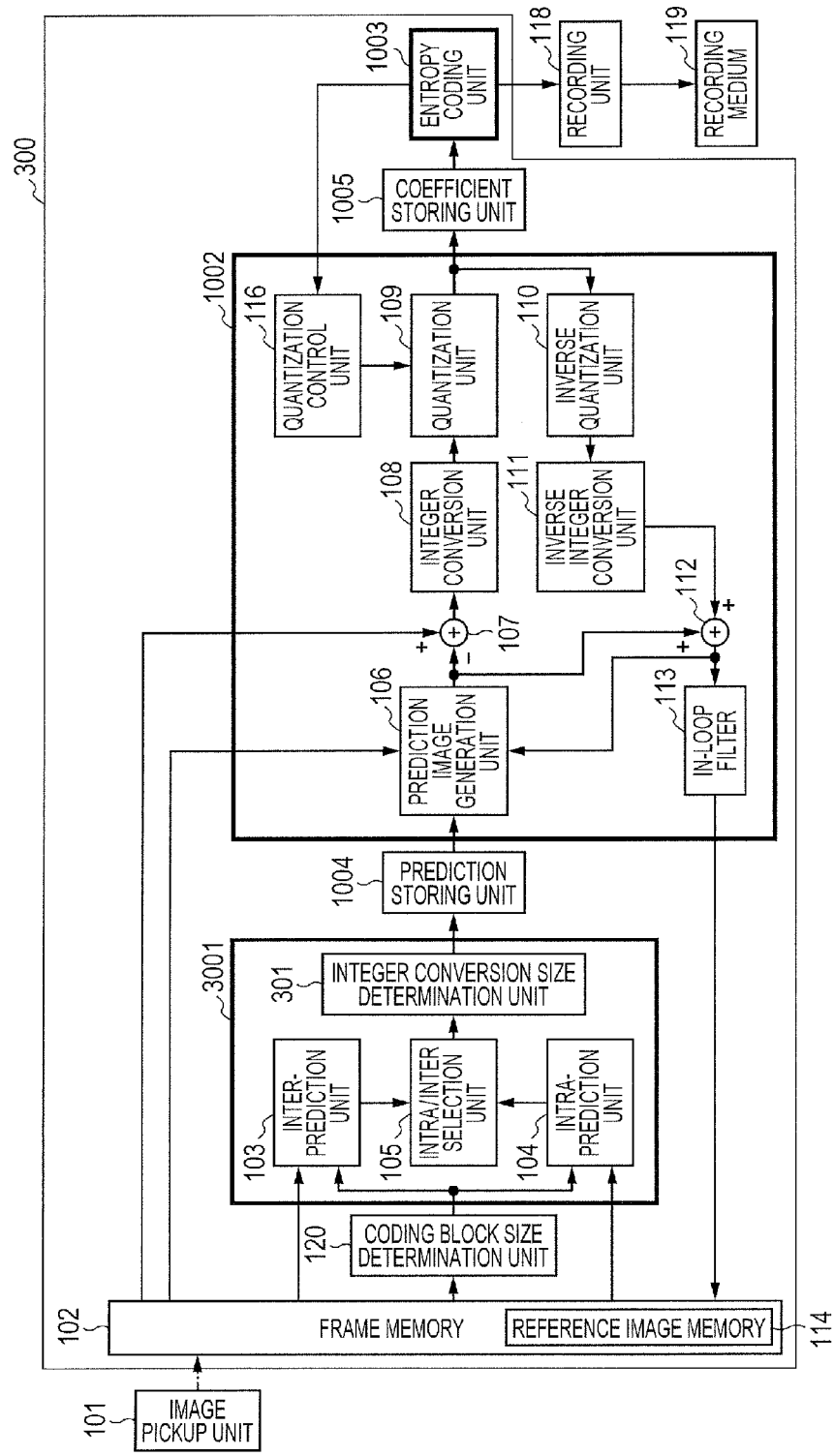
FIG. 3 is a block diagram exemplifying the arrangement of an image pickup apparatus including an image coding apparatus according to the second embodiment.

FIG. 3 is a block diagram exemplifying the arrangement of an image pickup apparatus including an image coding apparatus 300 according to the second embodiment. The image pickup apparatus of FIG. 3 is different from that of FIG. 1 in a prediction method determination unit 3001, and further includes an integer conversion size determination unit 301 which determines a TU size. The remaining arrangement is the same as that in the image pickup apparatus according to the first embodiment, and a description thereof will not be repeated.

After an intra/inter selection unit 105 selects a prediction method, it notifies the integer conversion size determination unit 301 of a prediction method selection signal.

When the size of a coding subject CU is 32×32 or 16×16, the integer conversion size determination unit 301 sets the TU size to be smaller than the CU size.

In a case where the size of a coding subject CU is 8×8, the TU size is determined in accordance with features of an image, such as the dispersion value of the coding subject CU. That is, in a case where the size of a coding subject CU is 8×8, the TU size need not always be set to be smaller than the CU size. Although the CU size is selectable from three sizes of 32×32, 16×16, and 8×8, it is not limited to them.

Even while the TU size is selected in accordance with features of an image or the like, the operation according to the present embodiment can shorten a delay of feedback of a generated code amount to a quantization control unit 116, and control the quantization coefficient at high accuracy.

The present invention is also implemented by executing the following processing. That is, software (computer program) for implementing the functions of the above-described embodiments is supplied to a system or apparatus via a network or various computer-readable storage media. Then, the computer (or CPU or MPU) of the system or apparatus reads out and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-140101, filed on Jun. 21, 2012, which is hereby incorporated by reference herein in its entirety.

What is claimed is:

1. A coding apparatus comprising:
    a memory that stores image data which is to be divided into CUs (coding units);
    a determination unit that determines a size of a first CU (coding unit) included in the CUs;
    a first generating unit that generates prediction image data after a size of the first CU is determined;
    a second generating unit that generates difference data of the first CU by using image data of the first CU and the prediction image data;
    an orthogonally transforming unit that transforms the difference data of the first CU into transformed data which is to be divided into TUs (transform units), wherein a size of a first TU (transform unit) included in the TUs is smaller than the determined size of the first CU;
    a quantization unit that quantizes transformed data of the first TU to generate quantized data of the first TU;
    an encoding unit that encodes the quantized data of the first TU to generates encoded data of the first TU; and
    a code amount controlling unit that controls a code amount of another CU (coding unit) included in the CUs by using a code amount of the encoded data of the first TU,
    wherein at least one of the determination unit, the first generating unit, the second generating unit, the orthogonally transforming unit, the quantization unit, the encoding unit, and the code amount controlling unit is implemented by a processor.

2. A method, comprising:
    causing a memory to store image data which is to be divided into CUs (coding units);
    causing a determination unit to determine a size of a first CU (coding unit) included in the CUs;
    causing a first generating unit to generate prediction image data after a size of the first CU is determined;
    causing a second generating unit to generate difference data of the first CU by using image data of the first CU and the prediction image data;

causing an orthogonally transforming unit to transform the difference data of the first CU into transformed data which is to be divided into TUs (transform units), wherein a size of a first TU (transform unit) included in the TUs is smaller than the determined size of the first CU;

causing a quantization unit to quantize transformed data of the first TU to generate quantized data of the first TU;

causing an encoding unit to encode the quantized data of the first TU to generate encoded data of the first TU; and causing a code amount controlling unit to control a code amount of another CU (coding unit) included in the CUs by using a code amount of the encoded data of the first TU, wherein at least one of the determination unit, the first generating unit, the second generating unit, the orthogonally transforming unit, the quantization unit, the encoding unit, and the code amount controlling unit is implemented by a processor.

3. A non-transitory computer-readable storage medium that stores a program for causing a computer to execute a method, the method comprising:

causing a memory to store image data which is to be divided into CUs (coding units);

causing a determination unit to determine a size of a first CU (coding unit) included in the CUs;

causing a first generating unit to generate prediction image data after a size of the first CU is determined;

causing a second generating unit to generate difference data of the first CU by using image data of the first CU and the prediction image data;

causing an orthogonally transforming unit to transform the difference data of the first CU into transformed data which is to be divided into TUs (transform units), wherein a size of a first TU (transform unit) included in the TUs is smaller than the determined size of the first CU;

causing a quantization unit to quantize transformed data of the first TU to generate quantized data of the first TU;

causing an encoding unit to encode the quantized data of the first TU to generates encoded data of the first TU; and causing a code amount controlling unit to control a code amount of another CU (coding unit) included in the CUs by using a code amount of the encoded data of the first TU.

4. The coding apparatus according to claim 1, further comprising:

an image capture unit that generates image data from a captured image, wherein the image data generated by the image capture unit is stored in the memory.

5. The coding apparatus according to claim 1, wherein in a case where the size of the first CU is 32×32 or 16×16, the size of the first TU is smaller than the size of the first CU.

6. The coding apparatus according to claim 1, wherein the encoding unit encodes the quantized data of the first TU by using an entropy coding.

7. The method according to claim 2, further comprising:

causing an image capture unit to generate image data from a captured image, wherein the image data generated by the image capture unit is stored in the memory.

8. The method according to claim 2, wherein in a case where the size of the first CU is 32×32 or 16×16, the size of the first TU is smaller than the size of the first CU.

9. The method according to claim 2, wherein the encoding unit encodes the quantized data of the first TU by using an entropy coding.

10. The non-transitory computer-readable storage medium according to claim 3, the method further comprising:

causing an image capture unit to generate image data from a captured image, wherein the image data generated by the image capture unit is stored in the memory.

11. The non-transitory computer-readable storage medium according to claim 3, wherein in a case where the size of the first CU is 32×32 or 16×16, the size of the first TU is smaller than the size of the first CU.

12. The non-transitory computer-readable storage medium according to claim 3, wherein the encoding unit encodes the quantized data of the first TU by using an entropy coding.

* * * * *